(12) United States Patent
Gainer et al.

(10) Patent No.: US 7,233,951 B1
(45) Date of Patent: Jun. 19, 2007

(54) SPREADSHEET GRID-LIKE CONTROL FOR A WEB-BASED COLLABORATION SYSTEM

(75) Inventors: David F. Gainer, Redmond, WA (US); Jonathan M. Sigler, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/782,511

(22) Filed: Feb. 18, 2004

(51) Int. Cl.
*G06F 17/00* (2006.01)
*G06F 12/00* (2006.01)
*G06F 7/00* (2006.01)

(52) U.S. Cl. .............................. 707/10; 707/101; 707/3
(58) Field of Classification Search .................. 707/10, 707/101, 3
See application file for complete search history.

(56) References Cited

U.S. PATENT DOCUMENTS

| | | | |
|---|---|---|---|
| 2002/0026478 A1* | 2/2002 | Rodgers et al. | 709/205 |
| 2003/0058277 A1* | 3/2003 | Bowman-Amuah | 345/765 |
| 2004/0267871 A1* | 12/2004 | Pratley et al. | 709/200 |
| 2005/0027696 A1* | 2/2005 | Swaminathan et al. | 707/3 |
| 2005/0050021 A1* | 3/2005 | Timmons | 707/3 |

OTHER PUBLICATIONS

P. Dewan et al; "A High-Level and Flexible Framework for Implementing Multiuser User Interfaces"; ACM Transactions on Information Systems, vol. 10, No. 4, Oct. 1992; pp. 345-380.
R. Hall et al., "Corona; A Communication Service for Scalable, Reliable Group Collaboration Systems", ACM, Inc., Computer Supported Cooperative Work, pp. 140-149, 1996.
M. Rees, "Evolving the Browser Towards a Standard User Interface Architecture", Australian Computer Society, Third Australian User Interfaces Conference, vol. 7, pp. 1-7, 2001.
R. Bidarra et al., "Web-based Collaborative Feature Modeling", Faculty of Information Technology and Systems, Delft University of Technology, pp. 319-320, 2001.
D. Fuller et al., "The Design of an Object-Oriented Collaborative Spreadsheet with Version Control and History Management", ACM-SAC, pp. 416-423, 1993.
J. Begole et al., "Flexible Collaboration Transparaency: Supporting Worker Independence in Replicated Application-Sharing Systems", ACM Transactions on Computer-Human Interaction, vol. 6, No. 2, pp. 95-132, Jun. 1999.

* cited by examiner

*Primary Examiner*—Christian Chace
*Assistant Examiner*—Kuen S. Lu
(74) *Attorney, Agent, or Firm*—Merchant & Gould P.C.

(57) ABSTRACT

The present invention is provides a system and method for interacting with data from a collaboration system over a network. Collaboration data is obtained from the collaboration system and stored locally at the client. Operations such as sorting and filtering may be completed by the local client without any interaction from the collaboration server. When an operation such as adding, changing, and deleting data is performed the collaboration server is contacted to determine whether or not the change is valid. Changes made to the local data automatically update the data at the collaboration server. List controls are added to the browser user interface that are similar to a spreadsheet, such as MS Excel, which enables a user to view, add, change, or delete information corresponding to the data stored by the collaboration system in a manner in which they are familiar.

15 Claims, 13 Drawing Sheets

SPREADSHEET GRID-LIKE CONTROL FOR A WEB-BASED COLLABORATION SYSTEM

BACKGROUND OF THE INVENTION

Web-based team collaboration services allow teams to create sites that may be accessed by team members for information sharing and document collaboration. The online collaboration is aimed at helping increase individual and team productivity.

Generally, collaboration system user interfaces are delivered almost exclusively as HTML within a browser to team members. For example, collaborative data may be presented as lists or tables of data to users in the form of simple HTML tables. Performing operations on the collaboration data (e.g. sorting, filtering, adding, changing, and deleting) is time consuming and difficult. This is for a number of reasons. One reason is that HTML by its very nature is not very interactive. Each operation needs one or more trips back to the collaboration server to access the data and to complete the operation. Users are reluctant to make changes to data when it is so time consuming and painstaking.

SUMMARY OF THE INVENTION

The present invention is directed towards providing a system and method for interacting with collaboration data from a collaboration system over a network.

According to one aspect of the invention, collaboration data is obtained from the collaboration system and temporarily stored locally at the client for interaction with the collaboration data. The collaboration data may be flushed from the local client when it is no longer being accessed.

According to another aspect of the invention, interaction with the collaboration data occurs at the client rather than the server. Operations such as sorting and filtering may be completed by the local client without any interaction from the collaboration server. When an operation, such as: adding, changing, and deleting data is performed, the collaboration server is contacted to determine whether or not the change is valid. If not, the user receives an error message and the data is not updated at the collaboration system.

According to another aspect of the invention, the user may keep interacting with the collaboration data when awaiting a response from the collaboration server regarding whether or not the change is valid.

According to another aspect of the invention, changes made to the local collaboration data automatically update the collaboration data at the collaboration server. In other words, once the user makes an acceptable change, the collaboration data is saved at the central collaboration server data store without requiring the user to perform a save operation.

According to yet another aspect of the invention, list controls are added to the browser user interface presented to the user that are similar to a spreadsheet. For example the spreadsheet may resemble Microsoft Excel, which enables a user to view, add, change, or delete information corresponding to the data stored by the collaboration system in a manner in which they are familiar.

According to a further aspect of the invention, an in-memory data cache provides storage for the collaboration data that is obtained from the collaboration server.

According to still yet another aspect of the invention, basic authentication and error handling services are provided by the client.

BRIEF DESCRIPTION OF THE DRAWINGS

FIGS. 6–13, show exemplary screenshots of interacting with locally stored collaboration data using a spreadsheet grid-like control, in accordance with aspects of the invention.

DETAILED DESCRIPTION OF THE PREFERRED EMBODIMENT

Generally, the present invention is directed towards providing a system and method for interacting with collaboration data from a collaboration system over a network. Upon a user attempt to access collaboration data from their web page coupled to the collaboration system, the collaboration data is obtained from the collaboration system and temporarily stored locally at the client for interaction. Storing the collaboration data locally helps to allow for interaction with the collaboration data locally at the client rather than having to interact with the server. Operations such as sorting and filtering may be completed by the local client without any interaction from the collaboration server. When an operation such as adding, changing, and deleting data is performed, the collaboration server is contacted to determine whether or not the change is valid. If not, the user receives an error message. The user may keep interacting with the data when awaiting a response from the collaboration server regarding whether or not the change is valid. Changes made to the local collaboration data automatically update the data at the collaboration server. In other words, once the user makes a valid change, the collaboration data is saved at the collaboration server data store. List controls are added to the browser user interface that are similar to a spreadsheet, such as Microsoft Excel, which enables a user to view, add, change, or delete information corresponding to the data stored by the collaboration system in a manner in which they are familiar.

Illustrative Operating Environment

Figure 1:
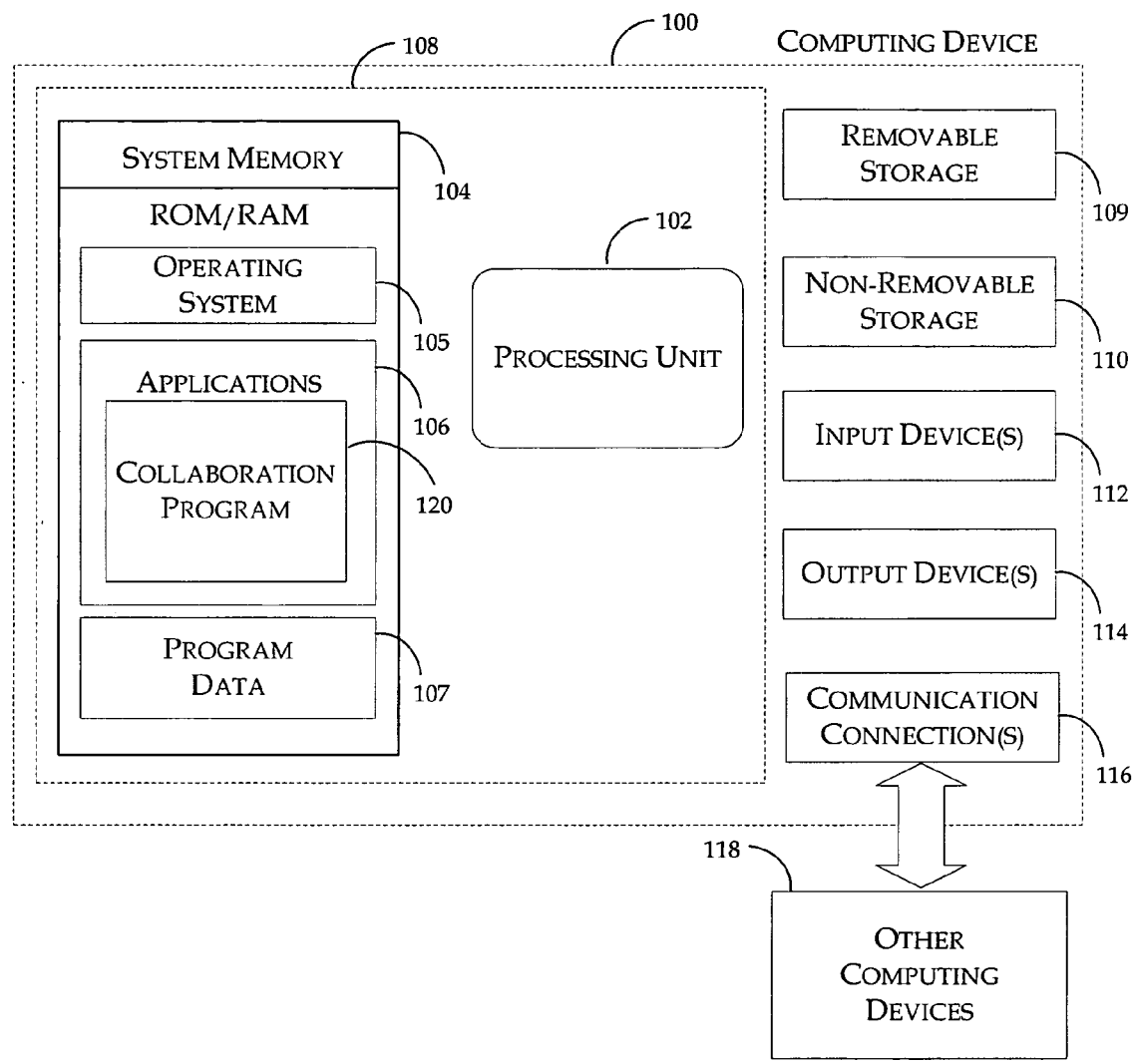
FIG. 1 illustrates and exemplary computing device that may be used according to exemplary embodiments of the present invention.

With reference to FIG. 1, one exemplary system for implementing the invention includes a computing device, such as computing device 100. Computing device may be configured as a client, a server, mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a collaboration application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Collaboration System

Figure 2:
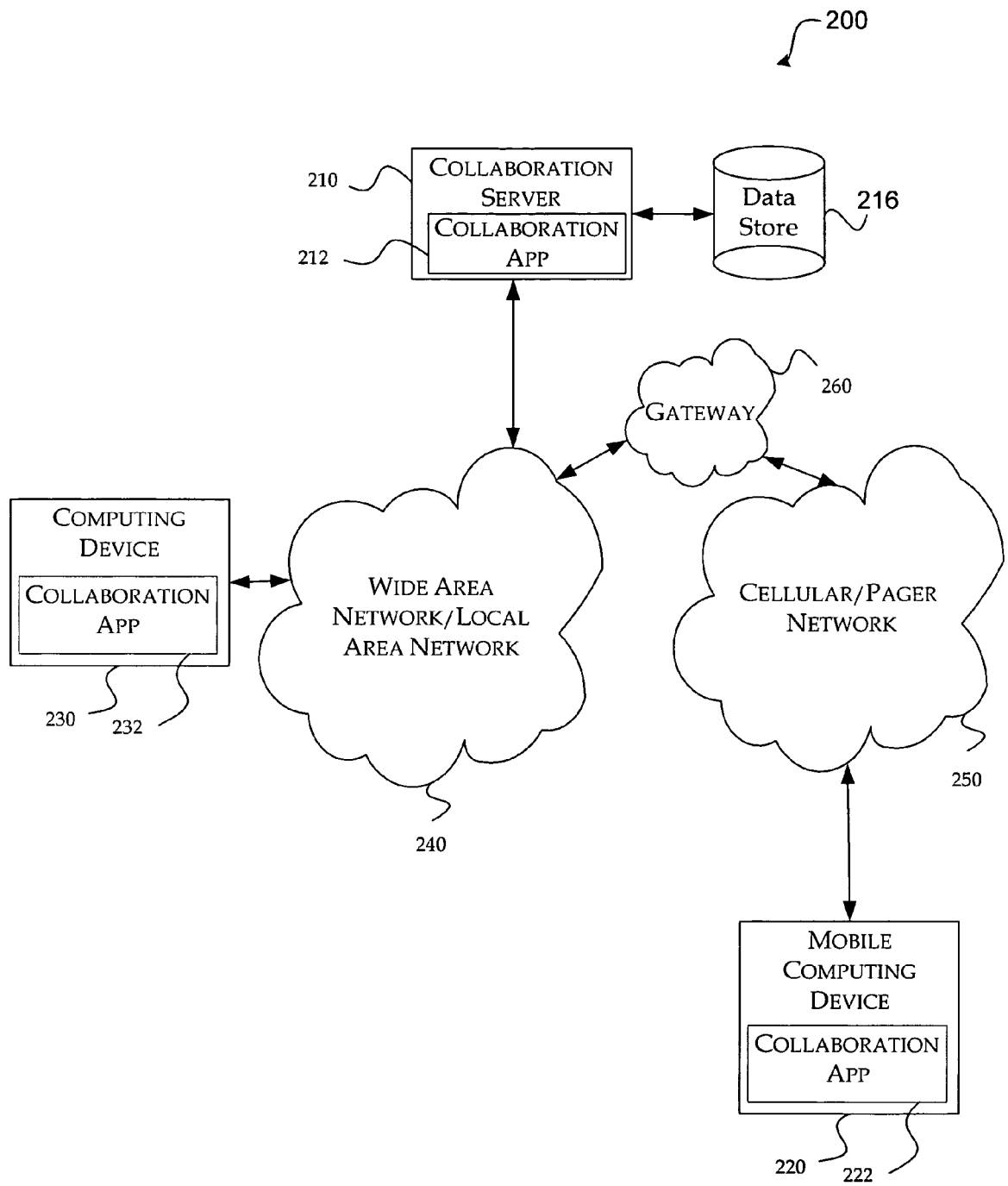
FIG. 2 is a functional block diagram generally illustrating a collaboration system.

FIG. 2 is a functional block diagram generally illustrating a collaboration system 200, in accordance with aspects of the invention. Server 210, computing device 230, and mobile computing device 220, such as a notebook, are computing devices such as the one described above in conjunction with FIG. 1. Server 210 runs collaboration application 212. Collaboration application 212 is configured provide data and operations relating to a network based collaboration system to clients, such as computing device 230 and computing device 220. The collaboration data stored at data store 216 may be transmitted over a wide area network (WAN)/local area network (LAN) 340 or a cellular pager/network to the clients. One example of a WAN is the Internet that connects millions of computers over a host of gateways, routers, switches, hubs, and the like. An example of a LAN is a network used to connect computers in a single office. A WAN may connect multiple LANs.

A client collaboration application, such as 222 or 232 residing on mobile device 220 or computing device 230, is configured to interact with collaboration application on server 210. Application 222 and 232 and collaboration application 212 may communicate using any one of several client-server protocols.

Cellular/pager network 250 is a network responsible for delivering messages to and receiving messages from wireless devices. The cellular/pager network 250 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like.

Gateway 260 routes messages between cellular/pager network 250 and WAN/LAN 240. For example, collaboration server may send data addressed to mobile computing device 220. Gateway 260 provides a means for transporting the message from the WAN/LAN 340 to cellular/pager network 250. Conversely, a user with a device connected to a cellular network may be accessing the Web. Gateway 260 allows hyperlink text protocol (HTTP) messages to be transferred between WAN/LAN 240 and cellular/pager network 250.

Collaboration server application 212 provides operations relating to a collaboration service and provides access to the collaboration data stored at data store 216. Collaboration client application (222 or 232) transmits and receives collaboration data from data store 216. Collaboration application 212 provides HTML code to the collaboration applications on the clients that enables their browser to show links associated with the collaboration data. When a user selects a link within their browser, the client collaboration application obtains the associated collaboration data from data store 216. The client device then stores the collaboration data locally and presents it to the user within a standard Web page within their browser. According to one embodiment, the collaboration data is presented to the user within a spreadsheet like control (hereinafter referred to as "List Control"). For example, the spreadsheet like control may provide the similar look and feel of the Microsoft Excel Spreadsheet. Providing the collaboration data to the user within the List Control helps to provide the user with an application with which they are familiar. The List Control is integrated with the HTML code and delivered within the user's Web page. The List Control helps to enable a rapid, powerful, Excel-like experience on top of data from the collaboration system.

When the user performs operations such as sorting and filtering they are completed locally by the client computing device without interaction from the collaboration server. When the user performs an operation such as adding, changing, and deleting data, the collaboration server is contacted to determine whether or not the change is valid. If the change is not valid (i.e., a "name" was inserted within a "numbers" field) the user receives an error message. The user may keep interacting with the local collaboration data when awaiting a response from the collaboration server regarding whether or not the change is valid.

Once the user makes a valid change, the data is saved at collaboration server data store 216. According to one embodiment of the invention, when the user is no longer interacting with the local collaboration data it is flushed from memory and reloaded from data store 216 at the next access to the associated link. Computing device 220 and 230 may be interacting with their own local copies of the collaboration data concurrently. If a client attempts to update a non-current record stored at data store, collaboration application 212 sends an error message to the computing device indicating that the collaboration data has been updated since the computing device last obtained the collaboration data. According to one embodiment, the error message includes the proposed changed data along with the current data stored in data store 216 and asks the user to decide whether or not to still make the change. A time stamp is maintained with the data both at data store 216 and the locally stored collaboration data in order to determine whether the data is current with respect to the clients. According to another embodiment of the invention, when a change is made to the collaboration data stored in data store 216, collaboration server 210 pushes the changed data to the computing devices such that all of the computing devices currently interacting with that data locally is updated.

Figure 3:
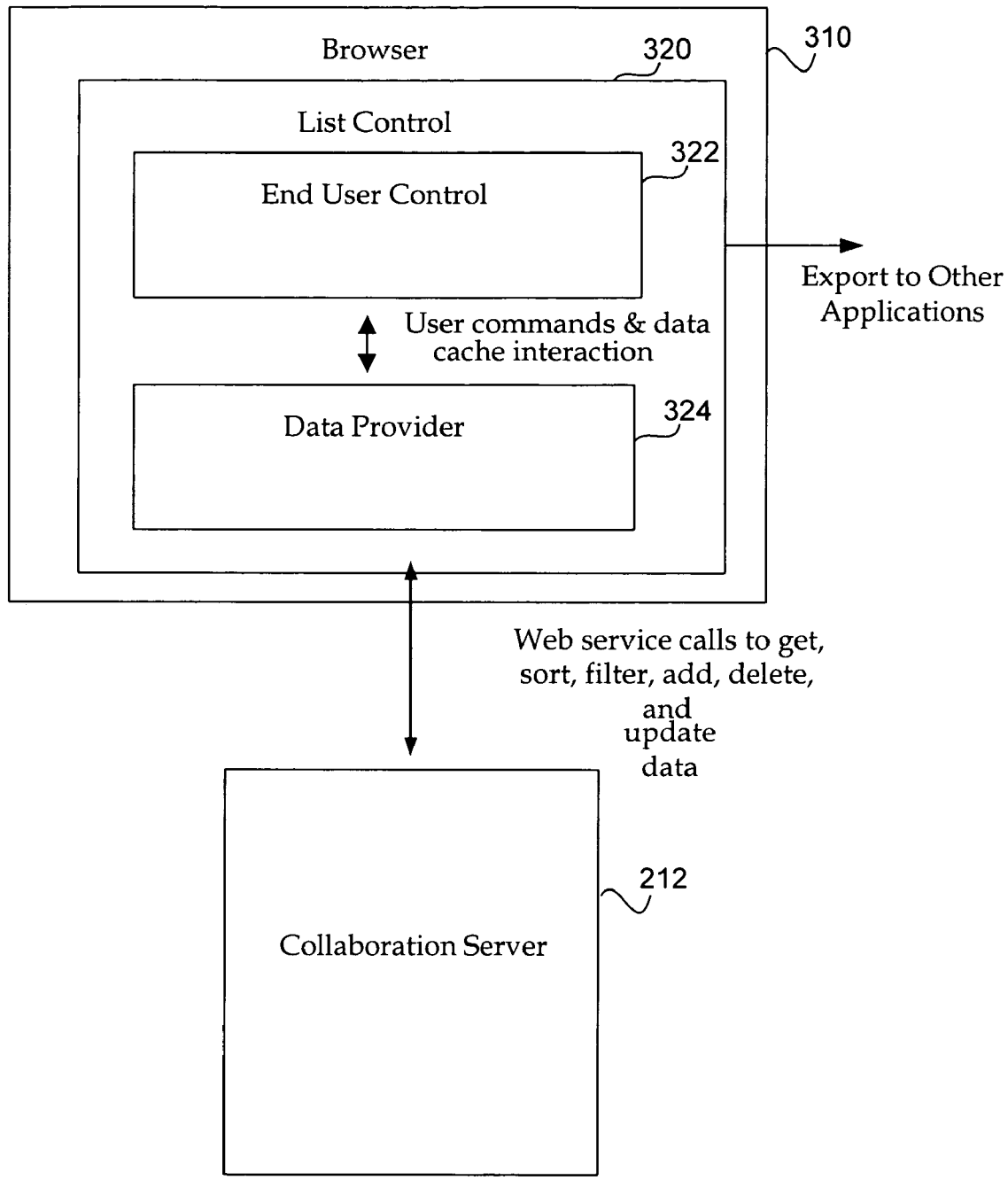
FIG. 3 shows a client's browser including a List Control interacting with a collaboration server.

FIG. 3 shows a client's browser, including a List Control, interacting with a collaboration server, in accordance with aspects of the invention. As discussed above, List Control 320 is provided within a user's browser window (310). List Control 320 includes end user control 322 and data provider 324.

List Control 320 is directed at providing a highly interactive user model for interacting with the collaboration data. When a user firsts accesses a link within browser 310 that is associated with collaboration data stored at the server, the user is presented with an HTML page containing a spreadsheet-like grid that contains the collaboration data in their list they selected. Specifically, when control 322 is instantiated by the HTML page, control 322 contacts collaboration server 212 and retrieves the entire contents of the collaboration data associated with the link into an in-memory data cache of data provider 324. Since the collaboration data is stored locally the user does not need to leave the browser in order to interact with the collaboration data in real-time. List control 320 is directed at providing the user with the same experience as though they were working with their favorite spreadsheet, both in terms of responsiveness as well as functionality. According to one embodiment, the spreadsheet is resembles the look and feel of Microsoft Excel.

End User Control 322 is a user interface that provides user interaction with the locally stored collaboration data. When the user wants to view, work with, add, change, or delete information from the collaboration system, they do so by interacting with this control. For example, the user can sort, filter, edit, copy, paste, add, and delete records from the locally stored collaboration data all within the single HTML page. All of these operations can generally be accomplished with a single click rather than a click to access each record contained within the list.

Data provider 324 is an in-memory data cache that provides data storage, manipulation, and update services for end user control 322. According to one embodiment, data provider 324 uses an OLEDB-like interface to communicate with end-user control 322 and web services to communicate with collaboration server 212. When a user works with List Control 320, the collaboration data being accessed is stored locally on the client. As the user works with the locally stored collaboration data, data provider 324 provides sorting, filtering, scrolling, and update functionality to List Control 320. Data provider 324 also provides basic authentication and error handling services to end-user control 322. For example, data provider 324 communicates with collaboration server 212 to determine if a change to the collaboration data is valid.

According to one embodiment, end user control 322 and data provider 324 are stored in one file (a DLL) on the client computing device. According to another embodiment, the end user control 322 and data provider 324 may also be stored in separate files. According to one embodiment, List Control 320 is an ActiveX control. The ActiveX control can be instantiated and run in any browser, such as browser 310, that is capable of hosting ActiveX controls.

List Control 320 is designed to look, feel, and operate consistently with the collaboration services provided by the collaboration system. Accordingly, the list control supports collaboration services concepts and features where possible without interfering with the spreadsheet-like feel and functionality described herein. According to one embodiment, the following is a representative list of the collaboration Services features implemented in the List Control:

Data types—collaboration services typically require users to declare data types (i.e. text, number, currency, date) when users create lists, and the data types have various semantics. The List Control is designed to implement the semantics of the collaboration service. Collaboration services typically apply some validation rules to certain data types by default (i.e. valid date formatting) and allow users to specify other validation rules. The List Control implements the same rules and the same mechanism for honoring custom rules specified by a user. Some list types implemented in collaboration services (i.e. moderated lists, calendar lists) have specific semantics (i.e. in a moderated list, an administrator needs to approve an entry before others can see the entry). The List Control implements the same semantics when possible. Administrators can control the look and feel of the collaboration services web sites using a theming feature. The List Control respects the web site theme with respect to colors, fonts, font sizes, etc. Some collaboration services provide list-level security on either a user or role basis using either anonymous or non-anonymous authentication. The List Control uses the same security concepts. Collaboration Services contains features to show users other users' Instant Messenger presence. For example, whether other users are on line or not. The List Control contains the same logic and users the same UI as the collaboration services. The List Control allows users to create calculated columns using an Excel-like function library. The collaboration services library and behavior is the same. Collaboration services lists allow users to attach documents to most list entries. The List Control provides the same capabilities.

The List Control is designed to offer strong integration with other applications. According to one embodiment, list control 320 is integrated with Microsoft Access and Microsoft Excel. From the list control, the user can undertake the following actions with a single click: Export their list to Excel (for analysis or offline use); Create a chart of their list in Excel; Create a PivotTable of their list in Excel; Create a table linked to their list in an Access database; and Create a report of their list in an Access database. The list control may be configured to work with other applications as well.

Figure 4:
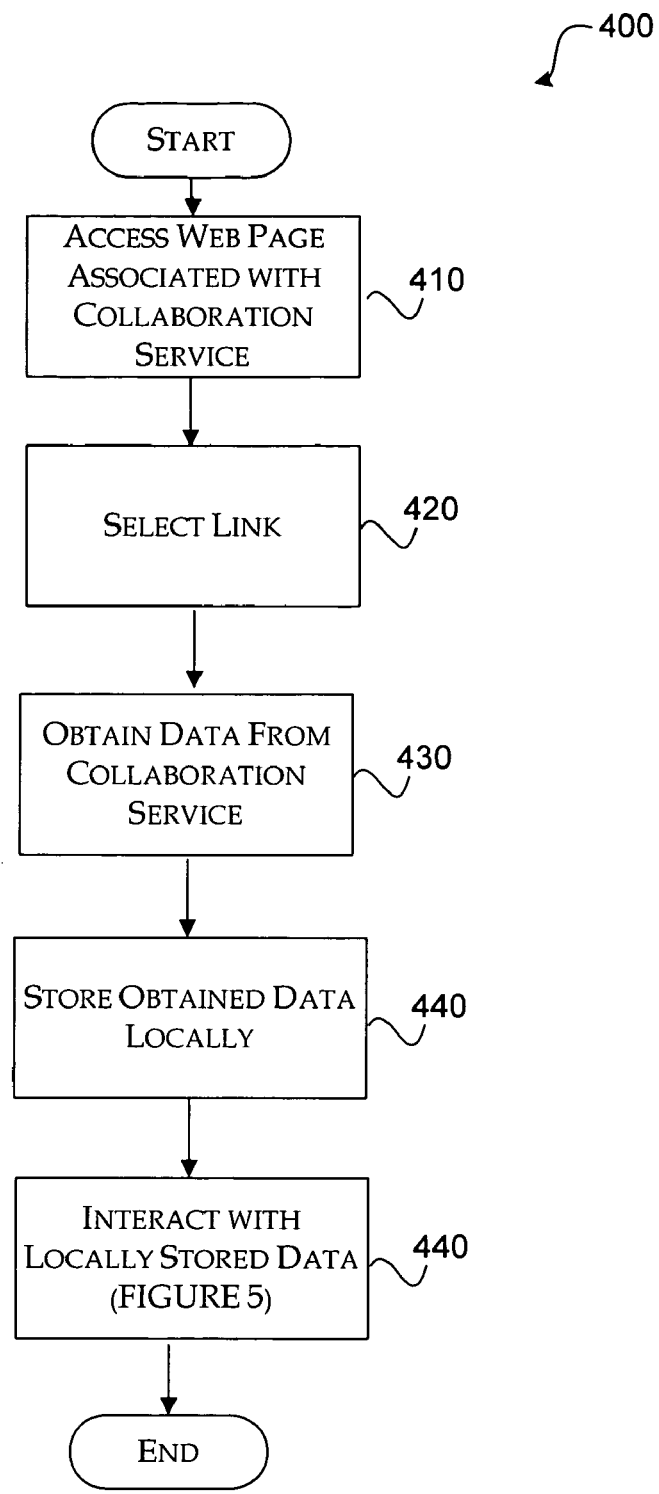
FIG. 4 illustrates a collaboration process for a client.

FIG. 4 illustrates a collaboration process for a client, in accordance with aspects of the invention. After a start block the process moves to block 410 where a web page associated with the collaboration service is accessed. The web page provides the user with links to collaboration data in which the user is part of the collaborative team. For example, if the user is part of a development group for a particular product then the web page will include links to collaboration data relating to that project.

Moving to block 420, the user selects a link. Upon selecting the link, the process moves to block 430 where the collaboration data associated with the link is obtained from the collaboration system and stored locally by the user. Transitioning to block 440, the collaboration data is stored in a data cache on the user's computing device. Moving to block 440, the user interacts with the locally stored data without having to access the collaboration data stored on the server.

Figure 5:
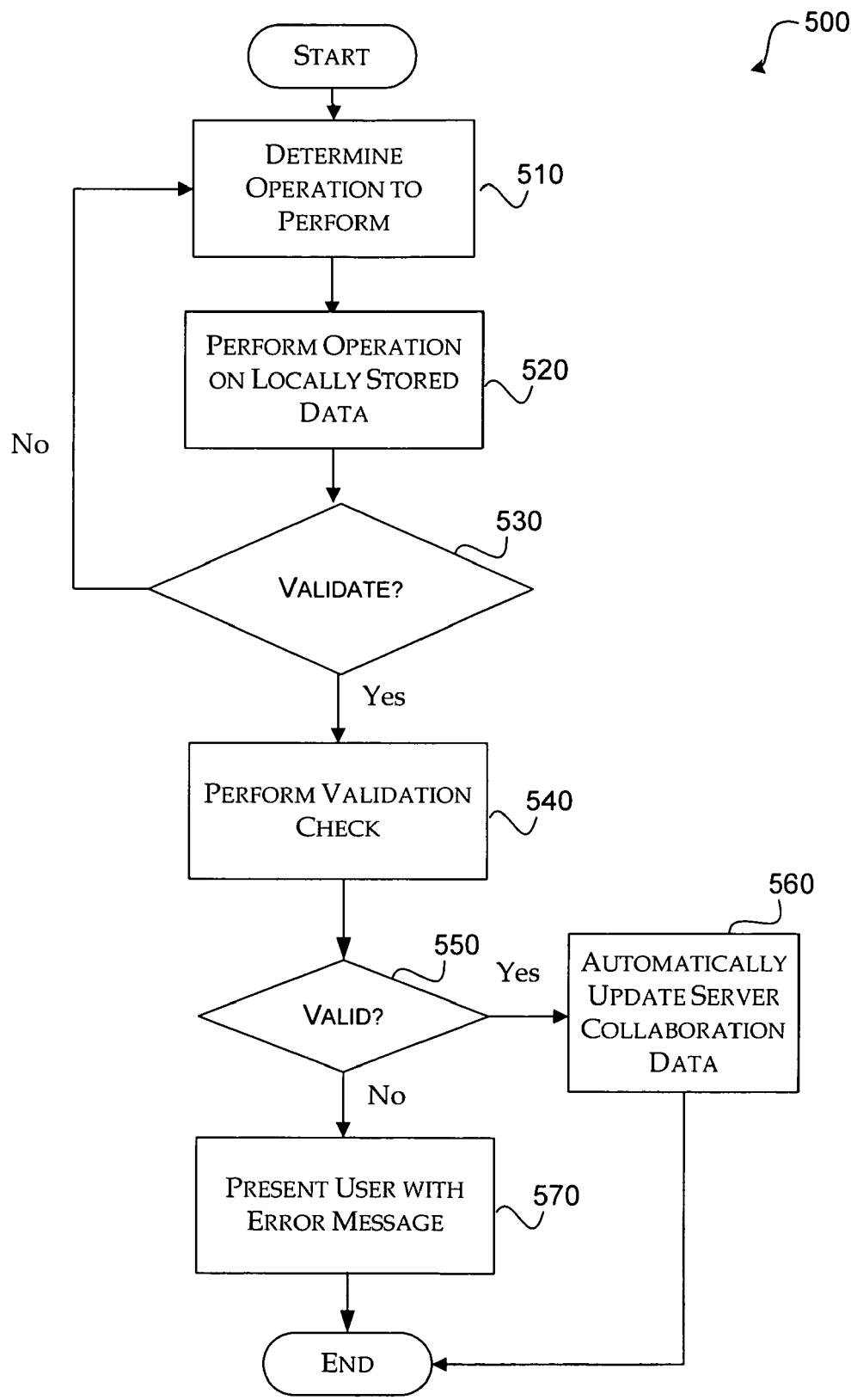
FIG. 5 illustrates interacting with locally stored collaboration data.

FIG. 5 illustrates interacting with locally stored collaboration data, in accordance with aspects of the invention. After a start block, the process flows to block 510 where a determination is made as to what type of operation is to be performed. According to one embodiment, the user may perform operations similar to those included in a spreadsheet, including: sorting, filtering, adding, changing, and deleting data.

Moving to block 520 the operation is performed on the locally stored collaboration data. Transitioning to decision block 530 a determination is made as to whether the operation performed should be validated.

Validation is used to help ensure that when the user makes a change to the local collaboration data that the changed data may be saved in the correct format within the collaboration server's data store. The validation could be as simple as checking to ensure that a number was entered in a number field, or could be as complex as performing a series of operations on the entry to determine if the data conforms to a predetermined standard. According to one embodiment, a validation check is performed when the user changes the data, deletes data, or adds a new entry. A validation check is not needed when the user merely manipulates the data, such as when the data is sorted or filtered as it is not affecting the actual contents of the collaboration data stored at the collaboration server.

When a validation check is not going to be performed the process returns to block 510 to determine more operations to perform. When a validation check is going to be performed, the process steps to block 540 where the data is sent to the collaboration system to determine if the entry is valid. While the validation check is being performed, the user may continue to perform other operations on the data.

Moving to decision block 550, a determination is made as to whether the data change is valid. If the data change is valid, the process moves to block 560 where the collaboration server data is automatically updated and saved. The process then steps to an end block.

When the data change is not valid, the process moves to block 570 where an error message is presented to the user. The process then steps to an end block and returns to processing other actions.

Spreadsheet Interaction Experience

FIGS. 6–13 show exemplary screenshots of interacting with locally stored collaboration data using a spreadsheet grid-like control, in accordance with aspects of the invention.

The spreadsheet grid-like control provides features to the user by providing a user interface and behavior that they are familiar with. According to one embodiment, the experience provides the user with the look and feel similar to using Microsoft Excel 2003. According to one embodiment of the invention, the following are exemplary features that are implemented in the List Control: Cell, row, and column selection and editing; Fill; Copy/Paste; Column and row resizing; Hidden columns; Pick from list; Sort; Filter; Advanced Filter; Calculated columns; Semi-selection; and Total row.

Figure 6:
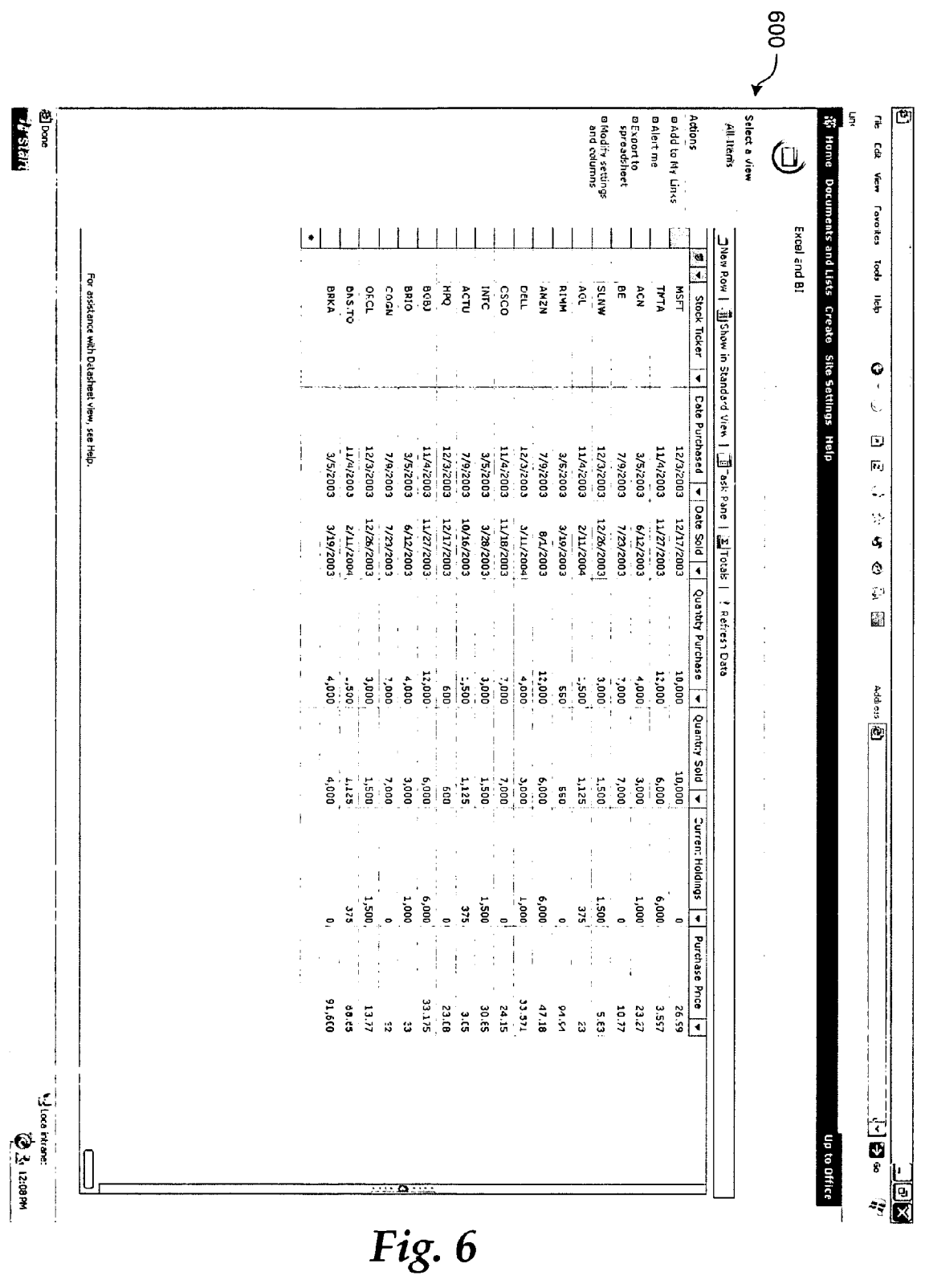

FIG. 6 illustrates an exemplary grid control screen, in accordance with aspects of the invention. According to the present example, the user selected a link from the collaboration system relating to stock purchases. The control shows columns, for the stock ticker, the date purchased, date sold, quantity purchased, quantity sold, current holdings, and purchase price. The user may perform any of the operations listed above within the grid control.

Figure 7:
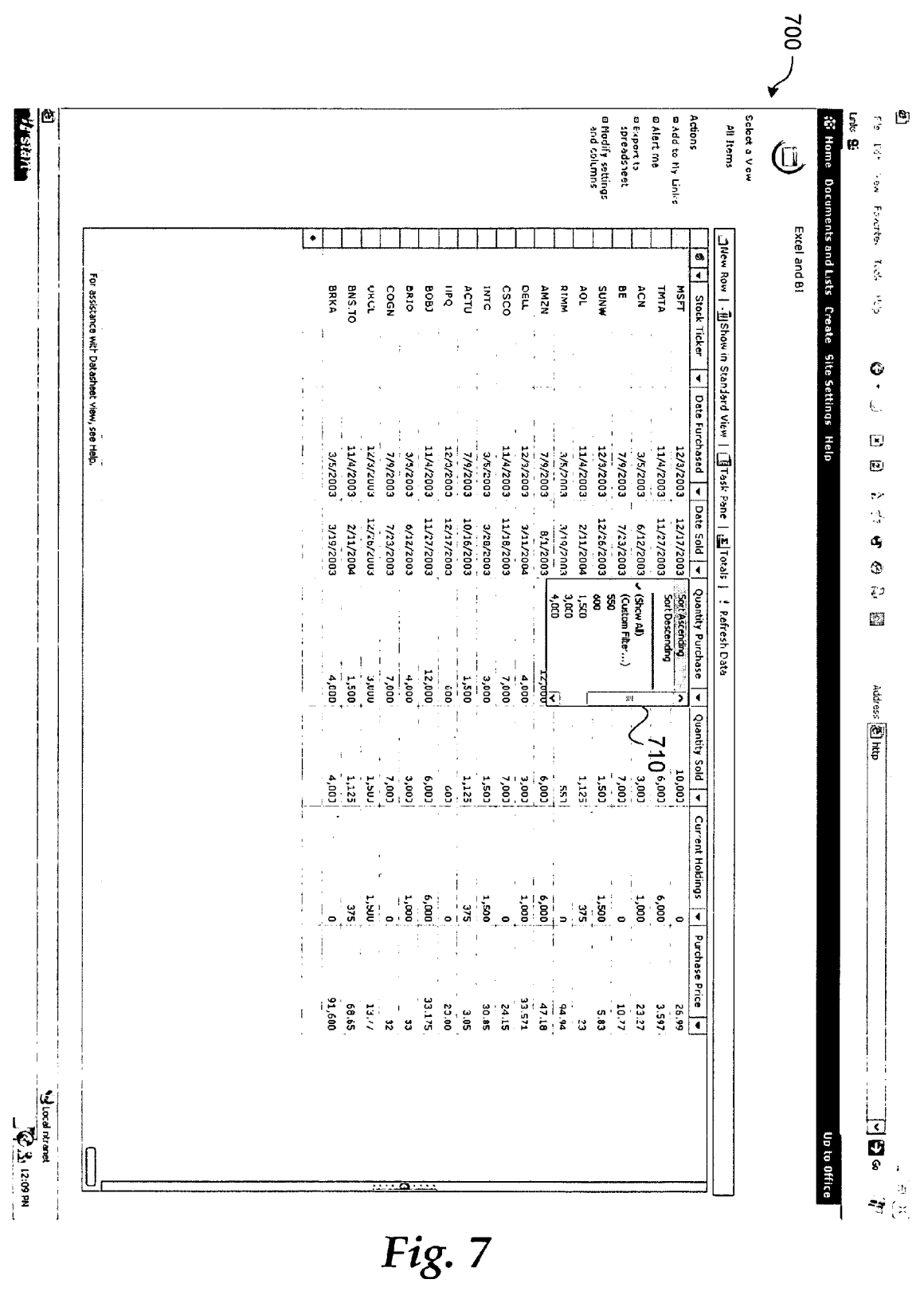

FIG. 7 illustrates an exemplary grid control screen using an auto filter, in accordance with aspects of the invention. Auto filter 710 associated with the quantity purchase column allows the user to sort the quantity purchase column automatically by selecting one of the menu items. According to one of the embodiments, each column in the grid control has an auto filter.

Figure 8:
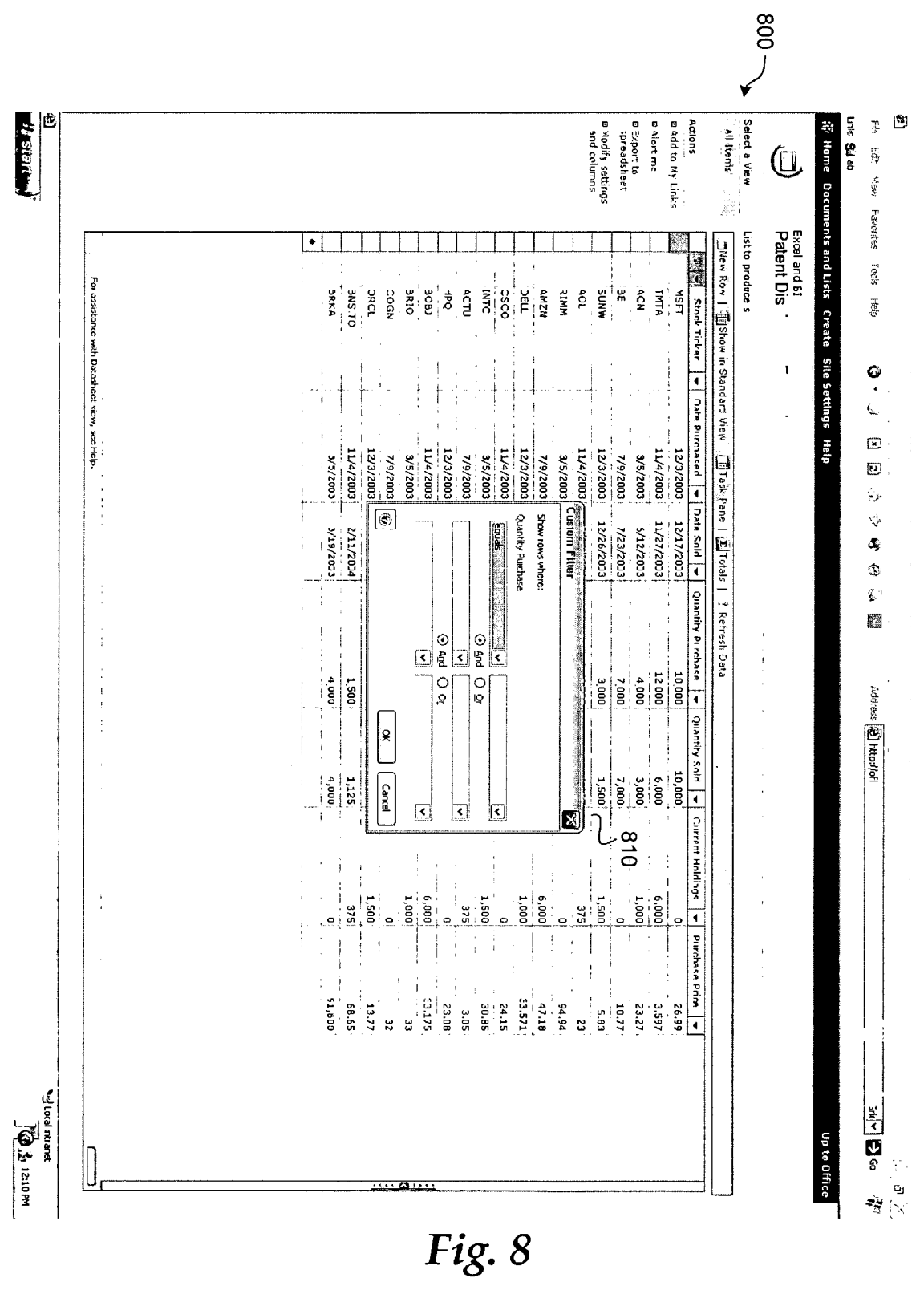

FIG. 8 shows an exemplary grid control screen using a custom filter, in accordance with aspects of the present invention. A custom filter may be used to create custom filtering for the data within the grid control. In the present example, the user has selected custom filter 810 to show rows in the quantity purchase column that match a set of criteria that is defined by the user. For example, the user could select to show only rows where the quantity purchased is 3,000.

Figure 9:
Figure 9:

FIG. 9 illustrates an exemplary grid control showing spreadsheet like calculations and semi-selection, in accordance with aspects of the present invention. Row 910 has been selected revealing the equation for current holdings.

Figure 10:
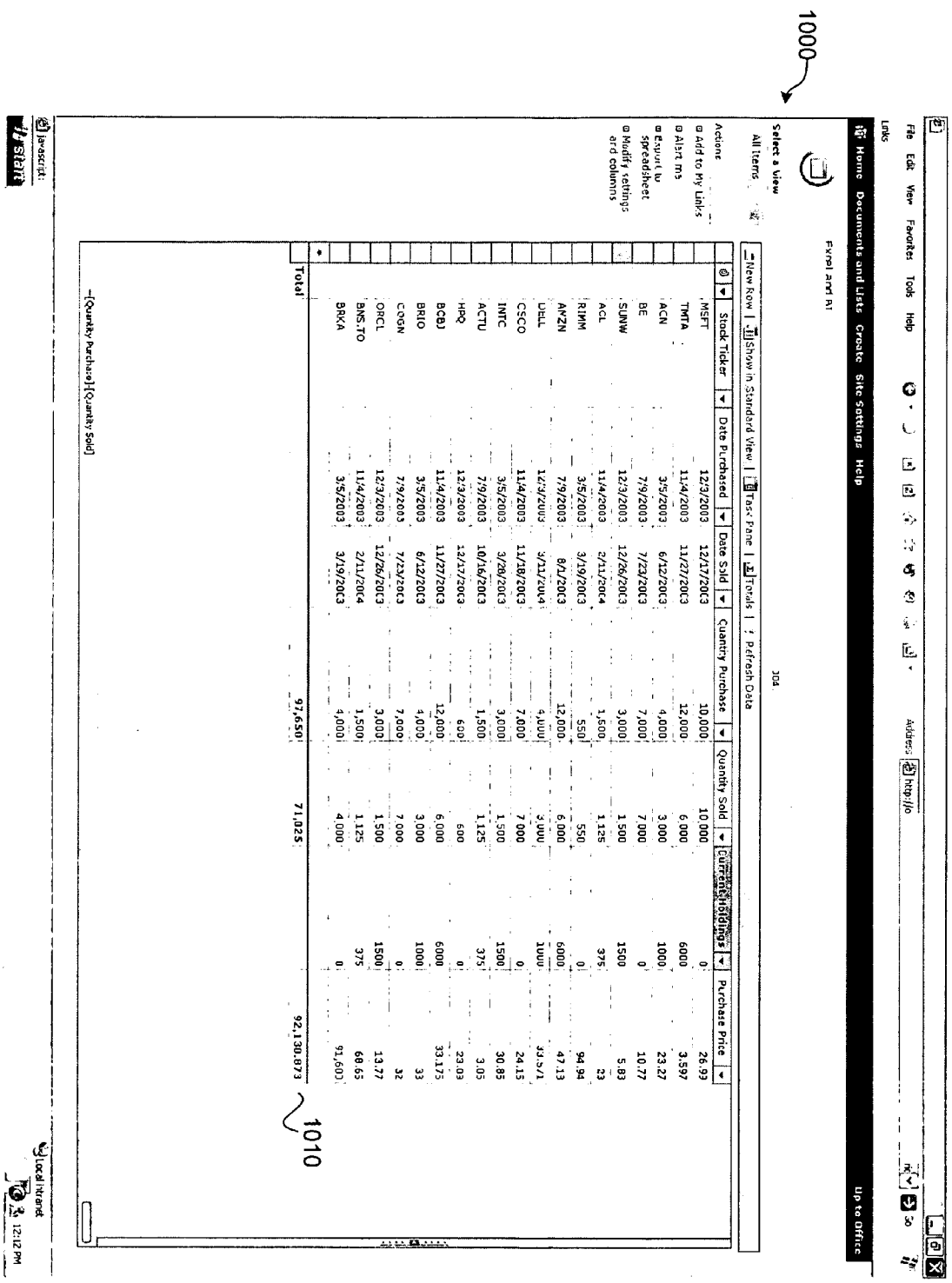

FIG. 10 shows an exemplary grid control with totals row, in accordance with aspects of the invention. Total row 1010 is displayed which displays the totals for three columns, the quantity purchased column, the quantity sold column, and the purchase price column. Total row 1010 may be turned on or off.

Figure 11:
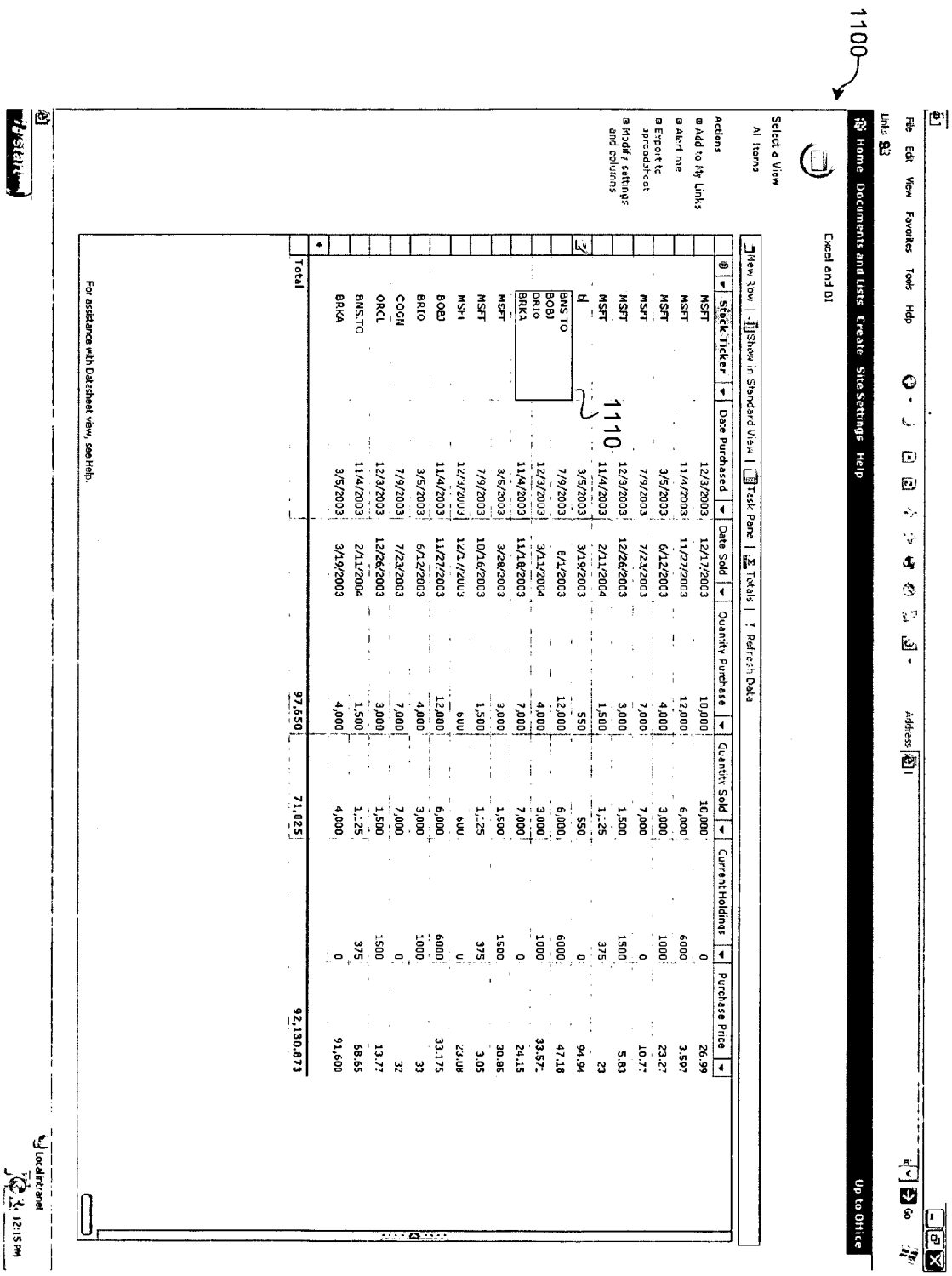

FIG. 11 illustrates an exemplary grid control selecting from a list, in accordance with aspects of the invention. In the present example, box 1110 shows a group of four stock ticker symbols selected by the user.

Figure 12:
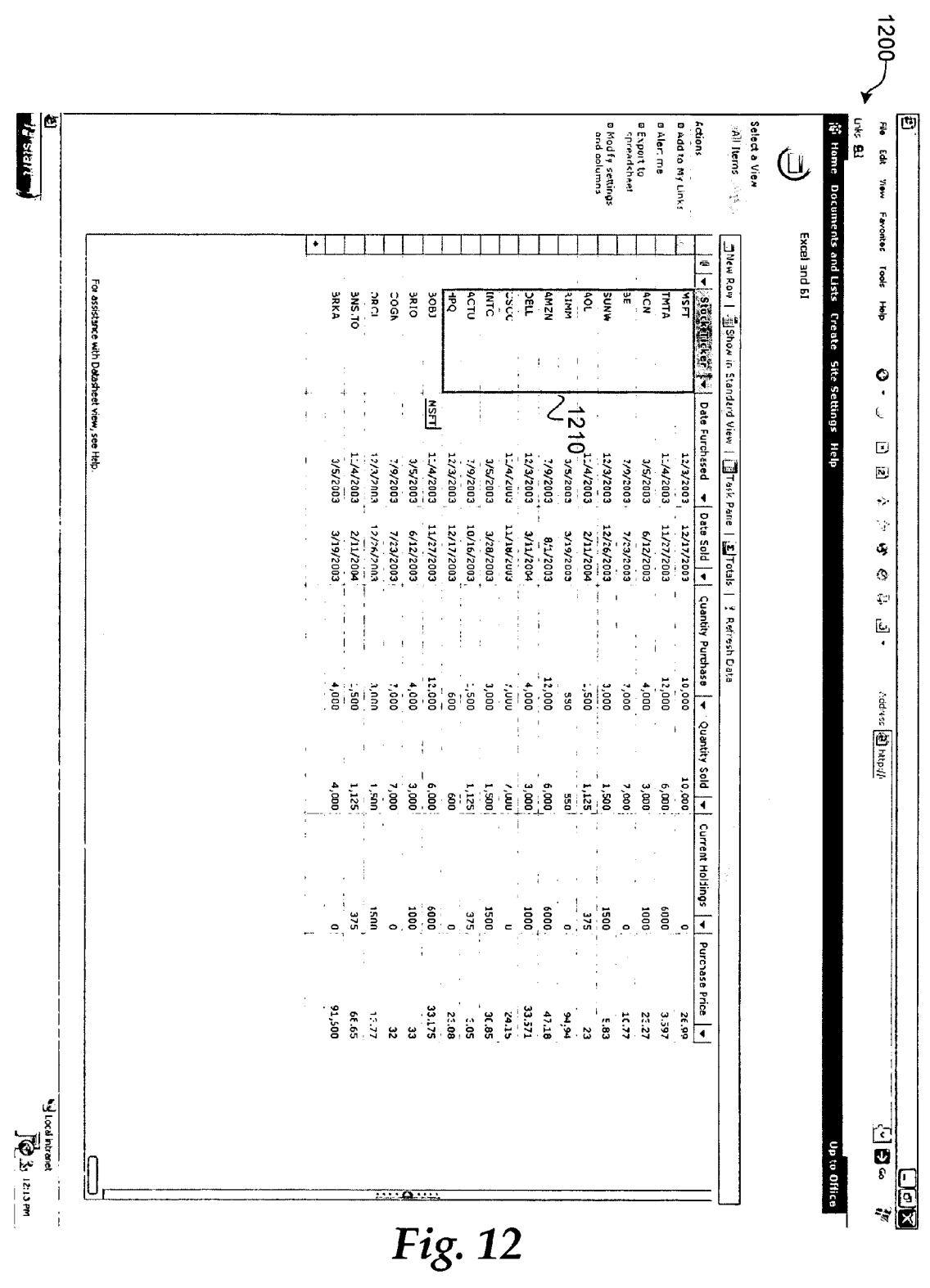

FIG. 12 shows an exemplary grid control with fill down, in accordance with aspects of the invention. In the present example, the stocks in box 1210 will be filled with the stock ticker symbol MSFT. This allows for multiple changes to be made to the list data at the same time.

Figure 13:
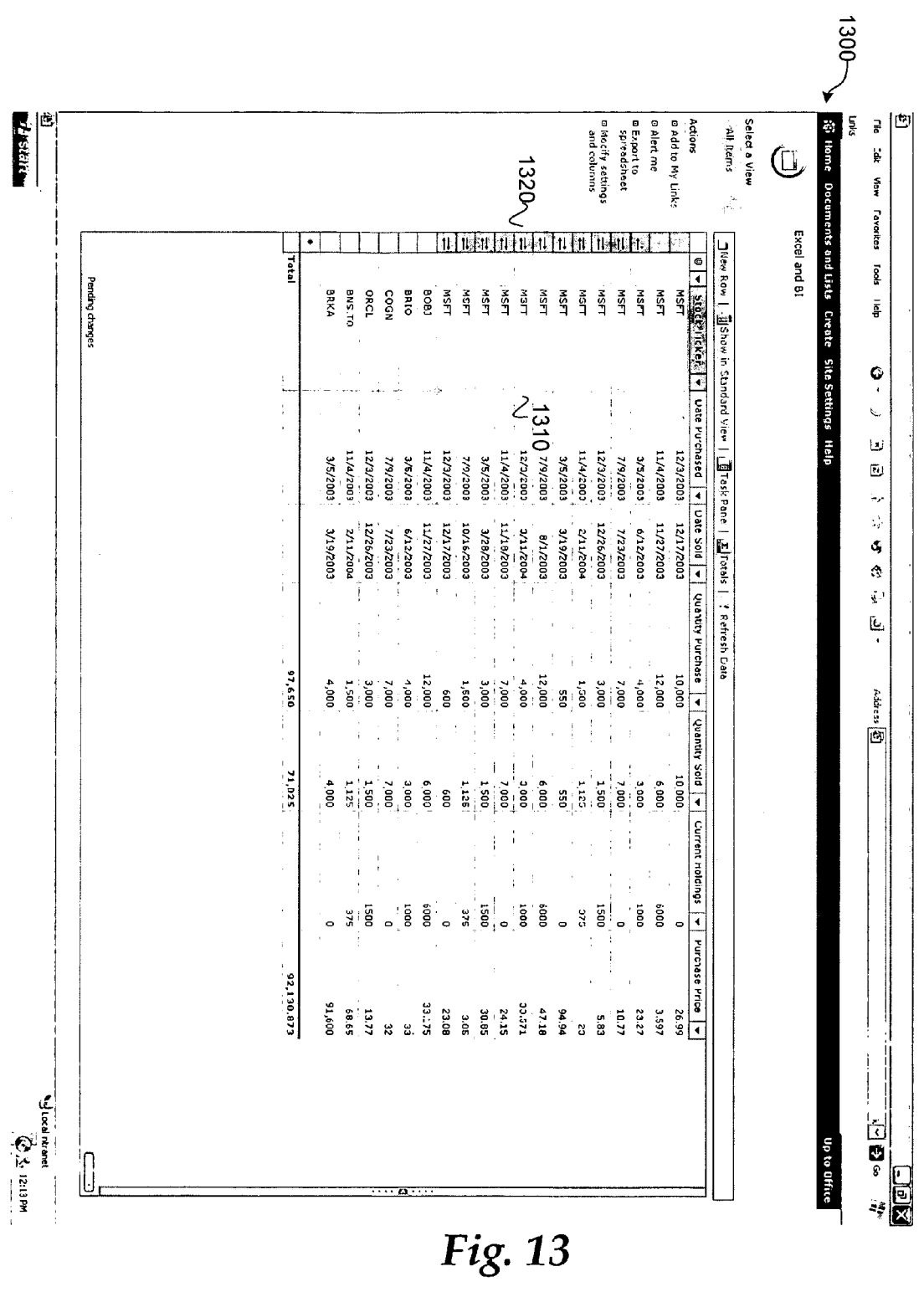

FIG. 13 illustrates an exemplary grid control showing validating the changes with the collaboration system, in accordance with aspects of the invention. Once the fill down with the MSFT symbol occurred as illustrated in FIG. 12, the changes are sent to the collaboration system to be validated. Column 1320 shows that the data is being validated by the collaboration system. During the time it takes to validate the changes, the user may continue to make changes to the data shown in the grid control.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interacting with collaboration data, comprising:
   accessing a web page that is associated with a collaboration service;
      wherein the web page includes a link that is associated with collaboration data that is stored in a non-local data store; and
      wherein multiple users perform operations on the collaboration data;
   selecting the link on the web page;
   obtaining the collaboration data from the non-local data store in response to the link on the web page being selected;

storing the non-local collaboration data locally;
interacting with the locally stored collaboration data;
wherein the interacting includes performing operations on the locally stored collaboration data;
modifying a value within the locally stored collaboration data;
determining whether the operations performed locally when modifying the value are valid;
updating the non-local collaboration data in the non-local data store with the modified value when the operations performed are valid;
sending an error message to the user when the operations performed are invalid; and
displaying the locally stored collaboration data within a spreadsheet control to a user.

2. The method of claim 1, wherein interacting with the locally stored collaboration data, further comprises allowing bulk operations to be performed on records of the locally stored collaboration data.

3. The method of claim 1, wherein updating the non-local collaboration data, further comprises allowing the user to keep interacting with the locally stored collaboration data during the update.

4. The method of claim 1, further comprising flushing the locally stored collaboration data when it is no longer being accessed.

5. The method of claim 1, wherein storing the non-local collaboration data locally further comprises storing the non-local collaboration data in a cache.

6. The method of claim 1, further comprising performing a validation check to determine whether a modification to the locally stored collaboration data is invalid.

7. A system for interacting with collaboration data, comprising:
a server including a network communication device coupled to a network and a data store configured to store collaboration data that is associated with a collaboration service;
a client including a display, a network communication device coupled to the network and a local data store, a browser including a web page configured to present at least one link to a user associated with the collaboration data, and an application that is configured to perform actions, including:
accessing the web page that is associated with the collaboration service;
wherein the web page includes the at least one link that is associated with collaboration data that is stored in a non-local data store; and
wherein multiple users perform operations on the collaboration data;
receiving a selection of the link on the web page shown in the display that is associated with the collaboration data;
obtaining the collaboration data from the data store;
storing the obtained collaboration data within the local data store;
interacting with the locally stored collaboration data without interacting with the server that is associated with the collaboration service;
wherein the interacting includes performing operations on the locally stored collaboration data;
modifying a value within the locally stored collaboration data;
determining whether the operations performed locally when modifying the value are valid;
updating the collaboration data at the data store with the modified value when the operations performed are valid;
sending an error message to the user when the operations performed are invalid; and
displaying the locally stored collaboration data within a spreadsheet control to a user.

8. The system of claim 7, wherein the application is further configured to attempt to update the collaboration data stored at the non-local data store while still allowing the user to interact with the locally stored collaboration data.

9. The system of claim 7, wherein the spreadsheet control is configured to provide functionality similar to functionality within a spreadsheet program.

10. The system of claim 7, wherein the data store is flushed when the locally stored collaboration data is no longer being accessed.

11. The system of claim 9, wherein the application is further configured to perform a validation check on changes to the collaboration data.

12. A computer-readable storage medium having computer executable instructions stored upon for interacting with collaboration data, the steps performed by executing the instructions comprising:
accessing a web page that is associated with a collaboration service;
wherein the web page includes a link that is associated with collaboration data that is stored in a non-local data store; and
wherein multiple users perform operations on the collaboration data;
receiving a selection of the link on the web page that is associated with collaboration data that is stored at the non-local data store;
obtaining the collaboration data from the non-local data store;
storing the collaboration data locally;
interacting with the locally stored collaboration data without accessing the non-local collaboration data;
wherein the interacting includes modifying a value in the locally stored collaboration data;
determining whether the operations performed locally when modifying the value are valid; updating the non-local collaboration data in the non-local data store with the modified value when the operations performed are valid;
sending an error message to the user when the operations performed are invalid; and
displaying the locally stored collaboration data within a spreadsheet control to a user.

13. The computer-readable medium of claim 12, further comprising updating the non-local collaboration data stored when a change to the locally stored collaboration data is valid.

14. The computer-readable medium of claim 13, further comprising allowing a user to keep interacting with the locally stored collaboration data during the updating.

15. The computer-readable medium of claim 12, wherein interacting with the locally stored collaboration data, further comprises performing at least one of the following operations, including: sorting, filtering, scrolling, pasting, and changing the locally stored collaboration data.

* * * * *